US012615682B2

(12) United States Patent
Liu et al.

(10) Patent No.: US 12,615,682 B2
(45) Date of Patent: Apr. 28, 2026

(54) NON-PUBLIC NETWORK MEASUREMENT METHOD AND APPARATUS, DEVICE, AND STORAGE MEDIUM

(71) Applicant: ZTE CORPORATION, Guangdong (CN)

(72) Inventors: Zhuang Liu, Guangdong (CN); Yin Gao, Guangdong (CN); Dapeng Li, Guangdong (CN); Jiajun Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 362 days.

(21) Appl. No.: 17/924,143

(22) PCT Filed: Aug. 2, 2021

(86) PCT No.: PCT/CN2021/109962
§ 371 (c)(1),
(2) Date: Nov. 9, 2022

(87) PCT Pub. No.: WO2022/028345
PCT Pub. Date: Feb. 10, 2022

(65) Prior Publication Data
US 2023/0199892 A1      Jun. 22, 2023

(30) Foreign Application Priority Data
Aug. 4, 2020      (CN) .......................... 202010772505.5

(51) Int. Cl.
*H04W 76/20*      (2018.01)
*H04W 24/10*      (2009.01)
*H04W 92/10*      (2009.01)
(52) U.S. Cl.
CPC ........... *H04W 76/20* (2018.02); *H04W 24/10* (2013.01); *H04W 92/10* (2013.01)

(58) Field of Classification Search
CPC .............................. H04W 24/10; H04W 92/10
See application file for complete search history.

(56) References Cited

U.S. PATENT DOCUMENTS

2010/0298017 A1      11/2010   Dalsgaard
2020/0221372 A1 *    7/2020    Shih ...................... H04W 76/25
(Continued)

FOREIGN PATENT DOCUMENTS

CN            101616424 A      12/2009
CN            101998485 A       3/2011
(Continued)

OTHER PUBLICATIONS

Huawei et al., "General considerations on connected mode for NPN," R2-2001377 3GPP TSG-RAN WG2 Meeting #109 electronic, 6.18.3: 7 pages (Mar. 2020).
(Continued)

*Primary Examiner* — Duc C Ho
(74) *Attorney, Agent, or Firm* — KDW FIRM PLLC

(57)      ABSTRACT

Provided are a non-public network measurement method and apparatus, a device, and a storage medium. The method includes: sending, through an air interface, a radio resource control (RRC) message including a non-public network (NPN) measurement configuration to at least one selected user equipment (UE), to instruct the UE to perform corresponding NPN measurement; and receiving a measurement report of the NPN measurement from the UE through an air interface. The measurement report includes an NPN measurement result of a corresponding UE. In the embodiment of the present disclosure, the NPN measurement configuration is sent through the RRC message, and thus NPN network information is detected, thereby facilitating NPN network capacity expansion and NPN network optimization.

19 Claims, 7 Drawing Sheets

Send a RRC message including an NPN measurement configuration to each of at least one selected UE through an air interface, to instruct each selected UE to perform corresponding NPN measurement ～100

Receive a measurement report of the corresponding NPN measurement from each selected UE through an air interface, where the measurement report includes a corresponding NPN measurement result of each selected UE ～110

(56) References Cited

U.S. PATENT DOCUMENTS

| | | | | |
|---|---|---|---|---|
| 2020/0329422 A1* | 10/2020 | Sirotkin | ................ | H04W 48/18 |
| 2020/0329524 A1* | 10/2020 | Park | ...................... | H04W 48/16 |
| 2021/0099924 A1* | 4/2021 | Shih | .................. | H04W 36/0061 |
| 2022/0264435 A1* | 8/2022 | Yang | ..................... | H04W 48/08 |

FOREIGN PATENT DOCUMENTS

| | | | | | |
|---|---|---|---|---|---|
| CN | 102149106 A | * | 8/2011 | ........... | H04W 48/18 |
| CN | 111918308 A | | 11/2020 | | |
| EP | 2677807 A1 | | 12/2013 | | |
| WO | 2020140830 A1 | | 7/2020 | | |

OTHER PUBLICATIONS

Nokia et al., "Impact of SNPN on PLMN Check for MDT," R2-1913547 3GPP TSG-RAN WG2 Meeting #107bis, NR_SON_MDT-Core—Release 16, 6. 12.2: 4 pages, (Oct. 2019).
Nokia, "Intermediate status report from email discussion [118][PRN] Connected mode aspects," R2-2001681 3GPP TSG-RAN WG2 Meeting #109e, NG_RAN_PRN-Core—Release 16, 16.8.3: 21 pages (Mar. 2020).
Extended European Search Report for Application No. 21853339.6, dated Apr. 12, 2024, 12 pages.
International Search Report for Application No. PCT/CN2021/109962, mailed Oct. 26, 2021, 5 pages.
Huawei, HiSilicon "Consideration on connected mode procedures" 3GPP TSG-RAN WG2 Meeting #107bis R2-1912310—Chongqing, China, Oct. 14-18, 2019.
Vivo "Discussion on ANR for NPN" 3GPP TSG-RAN WG2 Meeting #110 electronic—R2-2004743—E-Meeting, Jun. 1-Jun. 12, 2020.
CMCC, "R2-2001430 Access and mobility control for NPN," 3GPP TSG-RAN WG2 Meeting #109, Agenda Item: 6.18.4 (Feb. 24-28, 2020).
ZTE, "R3-190262 Consideration on support CAG in NR," 3GPP TSG-RAN WG3 Meeting #103, Agenda Item: 8.1 (Feb. 25-Mar. 1, 2020).
Chinese Office Action in CN Application No. 202010772505.5 dated Jun. 26, 2025, 7 pages.
European Office Action in EP Application No. 21853339.6 dated Oct. 30, 2025, 5 pages.

* cited by examiner

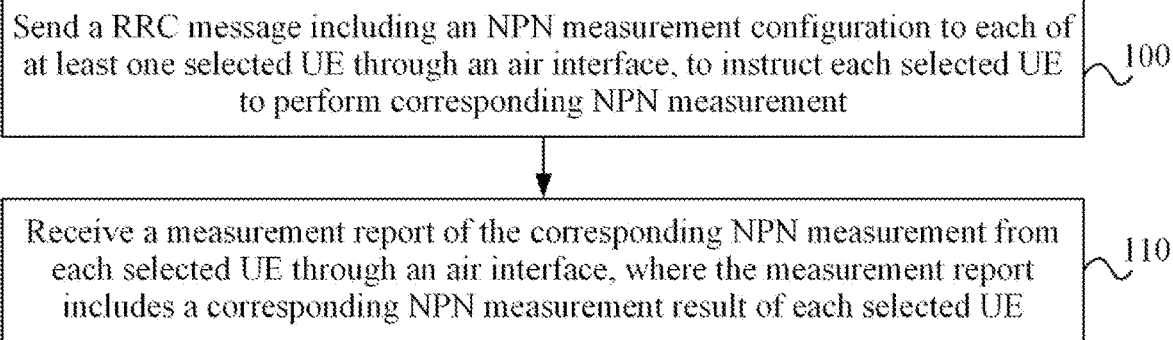

Send a RRC message including an NPN measurement configuration to each of at least one selected UE through an air interface, to instruct each selected UE to perform corresponding NPN measurement ∿100

Receive a measurement report of the corresponding NPN measurement from each selected UE through an air interface, where the measurement report includes a corresponding NPN measurement result of each selected UE ∿110

FIG. 1

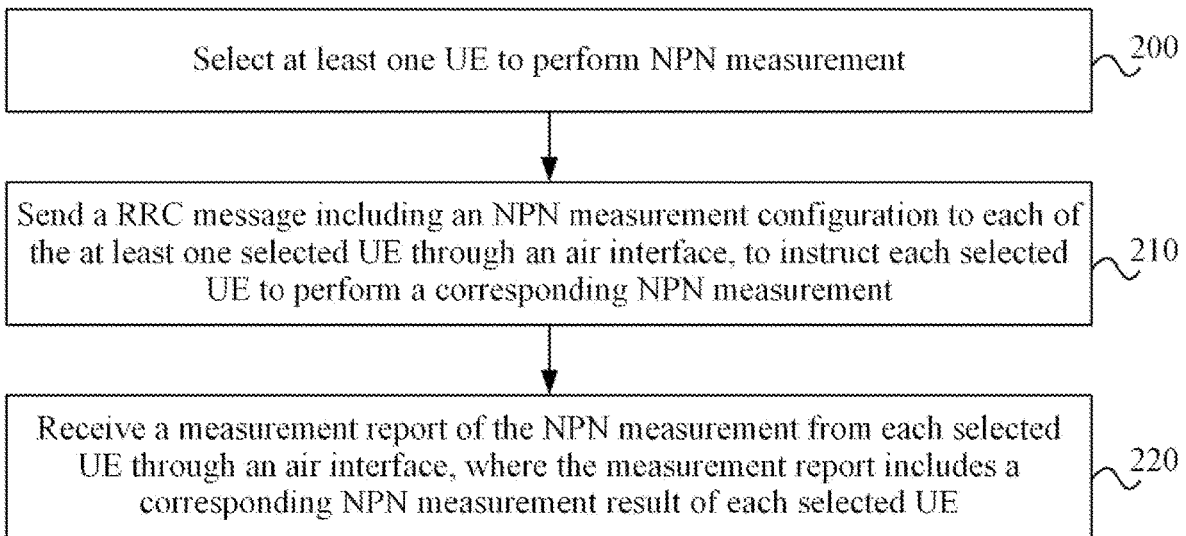

Select at least one UE to perform NPN measurement ∿200

Send a RRC message including an NPN measurement configuration to each of the at least one selected UE through an air interface, to instruct each selected UE to perform a corresponding NPN measurement ∿210

Receive a measurement report of the NPN measurement from each selected UE through an air interface, where the measurement report includes a corresponding NPN measurement result of each selected UE ∿220

FIG. 2

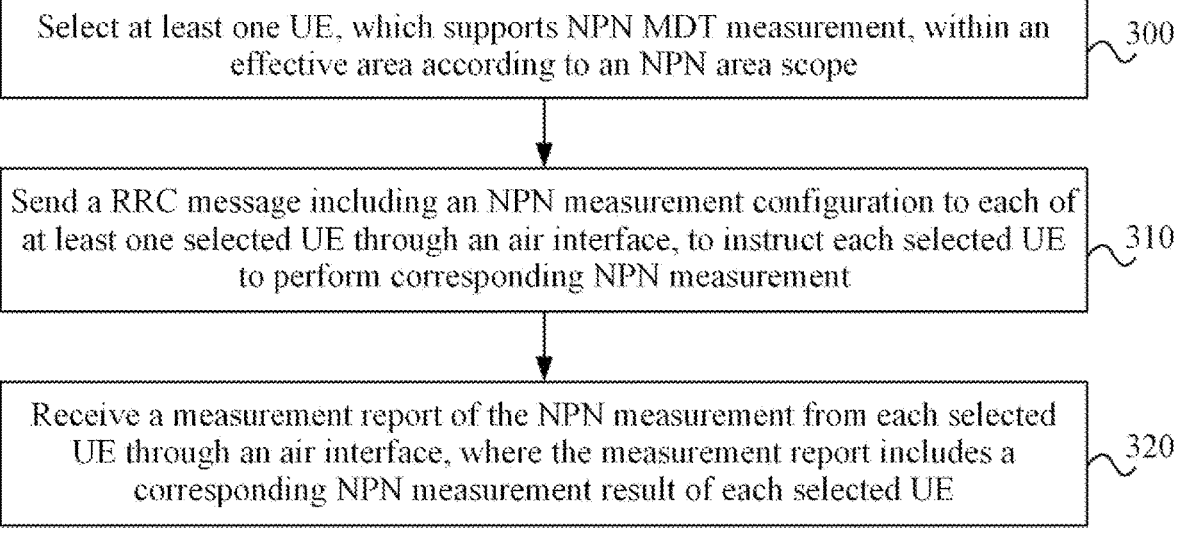

Select at least one UE, which supports NPN MDT measurement, within an effective area according to an NPN area scope ⌇300

Send a RRC message including an NPN measurement configuration to each of at least one selected UE through an air interface, to instruct each selected UE to perform corresponding NPN measurement ⌇310

Receive a measurement report of the NPN measurement from each selected UE through an air interface, where the measurement report includes a corresponding NPN measurement result of each selected UE ⌇320

FIG. 3

Select at least one UE to perform NPN measurement according to a support indication of NPN MDT measurement in a UE-associated message sent by a core network ⌇400

Send a RRC message including an NPN measurement configuration to each of at least one selected UE through an air interface, to instruct each selected UE to perform corresponding NPN measurement ⌇410

Receive a measurement report of the NPN measurement from each selected UE through an air interface, where the measurement report includes a corresponding NPN measurement result of each selected UE ⌇420

FIG. 4

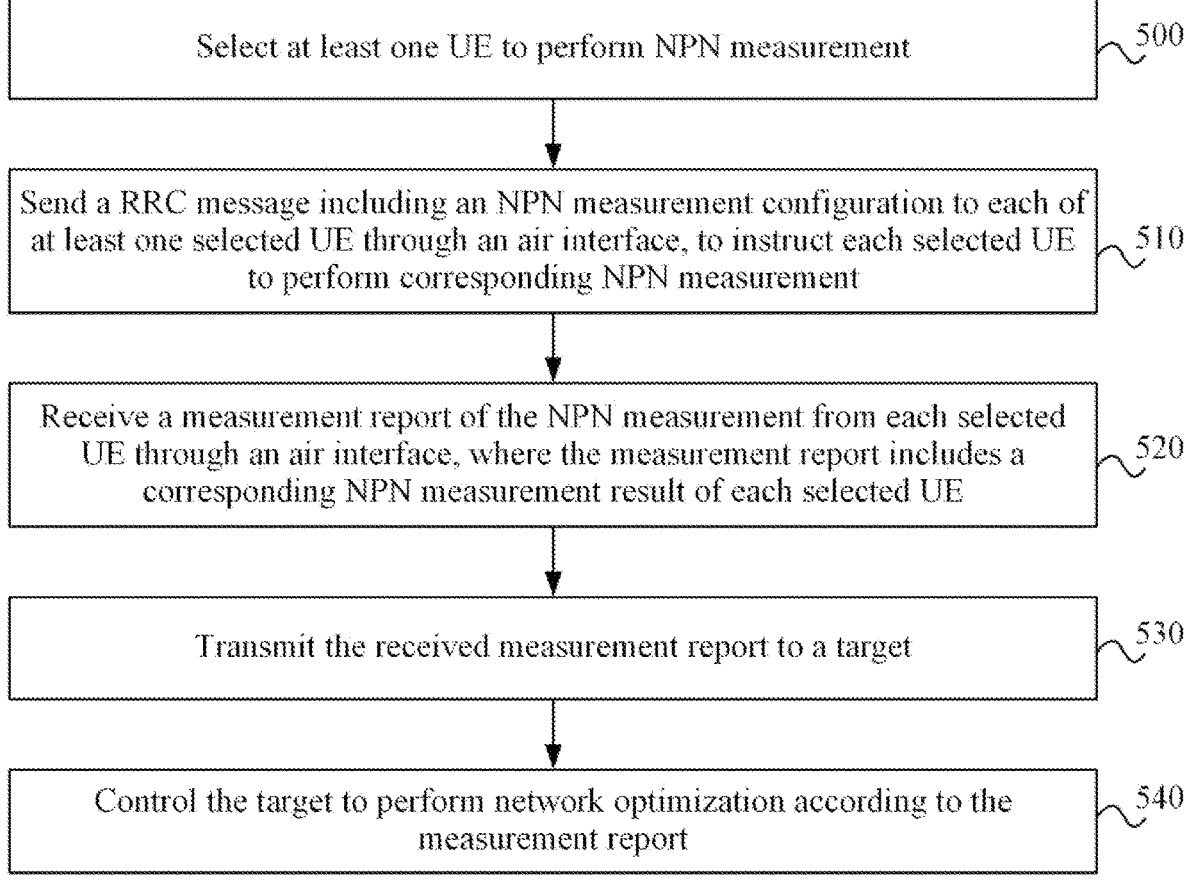

Select at least one UE to perform NPN measurement — 500

Send a RRC message including an NPN measurement configuration to each of at least one selected UE through an air interface, to instruct each selected UE to perform corresponding NPN measurement — 510

Receive a measurement report of the NPN measurement from each selected UE through an air interface, where the measurement report includes a corresponding NPN measurement result of each selected UE — 520

Transmit the received measurement report to a target — 530

Control the target to perform network optimization according to the measurement report — 540

FIG. 5

NON-PUBLIC NETWORK MEASUREMENT METHOD AND APPARATUS, DEVICE, AND STORAGE MEDIUM

CROSS-REFERENCE TO RELATED APPLICATIONS

This application is a national phase claiming the benefit of and priority to International Patent Application No. PCT/CN2021/1099629, entitled NON-PUBLIC NETWORK MEASUREMENT METHOD AND APPARATUS, DEVICE, AND STORAGE MEDIUM, filed Aug. 2, 2021, which claims priority to Chinese Patent Application No. 202010772505.5, filed on Aug. 4, 2020, which are hereby incorporated by reference in their entireties.

TECHNICAL FIELD

The present disclosure relates to the field of wireless communication and, in particular, to a non-public network measurement method and an apparatus, a device, and a storage medium.

BACKGROUND

The radio access network (RAN) of the 5th generation mobile communication technology (5G) supports a non-public network (NPN), which is a kind of network that is different from a public network and provides services to specific users. There are two types of non-public networks below: a standalone NPN (SNPN), which does not rely on a public land mobile network (PLMN) and is independently operated by an SNPN operator; and a non-standalone public network integrated NPN (PNI-NPN), which relies on a PLMN network and is operated by a traditional operator. Both the SNPN and the PNI-NPN can achieve end-to-end resource isolation, provide a dedicated access network for a vertical industry, guarantee exclusive access to customer resources of a vertical industry, and meet the requirements of users for a reliable and stable private network.

Currently, a 5G base station may be configured to support several NPN cells, for example, an SNPN cell or a PNI-NPN cell, and a subscriber may access a corresponding subscribed NPN network. However, after the subscriber accesses the NPN network through the authorization of a core network, a RAN network cannot determine information about the NPN network currently accessed by the subscriber and an operator cannot learn specifically which NPN network the subscriber accessed in the current network accesses, so that network optimization and network capacity expansion cannot be performed according to different NPN network loads.

SUMMARY

An embodiment of the present disclosure provides a non-public network measurement method and an apparatus, a device, and a storage medium to achieve the collection of NPN network information and facilitate network optimization and network capacity expansion according to different NPN network loads.

An embodiment of the present disclosure provides a non-public network measurement method, which includes: sending, through an air interface, a radio resource control (RRC) message including a non-public network (NPN) measurement configuration to each of at least one selected user equipment (UE), to instruct each selected UE to perform a respective NPN measurement; and receiving a measurement report of the respective NPN measurement from each selected UE through an air interface. The measurement report includes a respective NPN measurement result of each selected UE.

An embodiment of the present disclosure provides a non-public network measurement apparatus, which includes: a measurement configuration module configured to send, through an air interface, a radio resource control (RRC) message including a non-public network (NPN) measurement configuration to each of at least one selected user equipment (UE), to instruct each selected UE to perform a respective NPN measurement; and a result receiving module configured to receive a measurement report of the respective NPN measurement from each selected UE through an air interface. The measurement report includes a respective NPN measurement result of each selected UE.

An embodiment of the present disclosure provides a device, which includes: one or more processors; and a memory, which is configured to store one or more programs; where when the one or more programs are executed by the one or more processors, the one or more processors implement any non-public network measurement method provided in any embodiment of the present disclosure.

An embodiment of the present disclosure provides a computer-readable storage medium storing computer programs. When executed by a processor, the computer programs implement any non-public network measurement method provided in any embodiment of the present disclosure.

In an embodiment of the present disclosure, a radio resource control (RRC) message including a non-public network (NPN) measurement configuration is sent through an air interface to a selected user equipment (UE). The selected UE is controlled to perform measurement according to the NPN measurement configuration, and an NPN measurement report is acquired from the selected UE. The measurement report includes the measurement result corresponding to the selected UE. In this manner, the measurement of network information in the non-public network is realized, thereby facilitating network optimization and network capacity expansion according to different NPN network loads.

BRIEF DESCRIPTION OF DRAWINGS

FIG. 1 is a flowchart of a non-public network measurement method according to an embodiment of the present disclosure;

FIG. 2 is a flowchart of another non-public network measurement method according to an embodiment of the present disclosure;

FIG. 3 is a flowchart of another non-public network measurement method according to an embodiment of the present disclosure;

FIG. 4 is a flowchart of another non-public network measurement method according to an embodiment of the present disclosure;

FIG. 5 is a flowchart of another non-public network measurement method according to an embodiment of the present disclosure;

DETAILED DESCRIPTION

Figure 6:
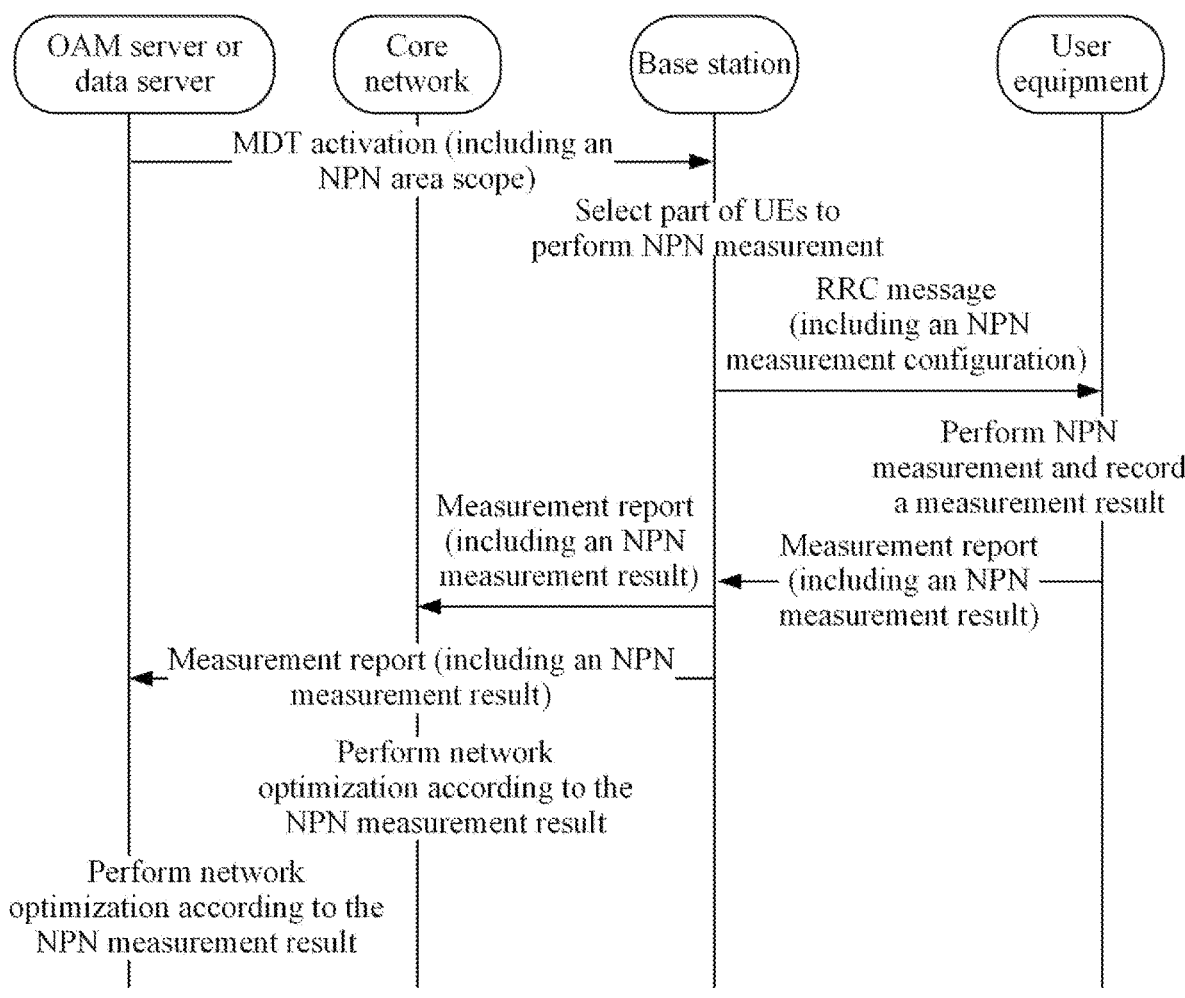
FIG. 6 is an exemplary diagram of NPN minimization of drive-tests (MDT) measurement according to an embodiment of the present disclosure.

To illustrate the object, solutions, and advantages of the present disclosure clearer, embodiments of the present disclosure are described hereinafter in detail in conjunction with the drawings. It is to be noted that if not in collision, embodiments of the present disclosure and features in embodiments therein may be combined in any manner.

An SNPN network can be determined by a PLMN identifier (PLMN ID) and a network identifier (NID). For example, a PLMN ID and an NID may be used together as the identification of an SNPN network. A user who subscribes to a certain SNPN service will be configured with a corresponding subscriber permanent identifier (SUPI) and corresponding subscription information, and the SUPI and the subscription information may be stored in a user equipment side and a core network side. In an initial access procedure and a cell re-selection procedure, a next generation radio access network node (NG-RAN node) needs to broadcast an NID, which is supported by the NG-RAN node, and corresponding PLMN ID information, and a user can select an accessible SNPN cell according to the subscription information of the user, and the core network also can authenticate a user identity according to the subscription information of the user.

A PNI-NPN provides NPN services through the PLMN network, and in this type of network, a UE also can subscribe to the PLMN network. The PNI-NPN performs access control through a closed access group (CAG). The CAG represents a group of subscribers who are permitted to access one or more CAG cells. First, a CAG may be determined by a PLMN ID and a CAG ID. The relationship between a user and a CAG is similar to a subscription. A cell enabling a CAG only allows the access of the user subscribing to the CAG. When a user subscribes to the CAG, an allowed CAG list supported by the user will be configured in subscription information, and the list stores all the CAG IDs that the current user can access. In an initial access procedure and a cell re-selection procedure, an NG-RAN node needs to broadcast a CAG ID supported by the NG-RAN node itself and corresponding PLMN ID information. A CAG subscriber selects an accessible CAG cell to access a network according to the subscriber's own CAG list. The subscriber sends a selected CAG list to the core network through access stratum (AS) information, and the core network can authenticate the CAG list of the subscriber according to subscription information of the subscriber and send the authenticated CAG list to a RAN network.

The handover of a CAG cell requires that a base station or a core network should judge a target base station to determine that at least one CAD ID supported by the target base station exists in the CAG list of the subscriber. That is, after the access of a subscriber, a base station only knows the CAG list of the subscriber, and the base station only requires that one CAG ID among a CAG supported by the base station itself is in the CAG list so that the subscriber can be granted access. However, the base station does not know specifically which CAG network the subscriber is accessing.

Since the RAN network side cannot know information about the NPN network currently accessed by the user, the operator cannot learn specifically which NPN network the NPN subscriber accessed in the current network accesses so that network optimization and network capacity expansion cannot be performed for NPN networks.

FIG. 1 is a flowchart of a non-public network measurement method according to an embodiment of the present disclosure. The embodiment of the present disclosure can be applied to measure network information in a non-public network, and the method can be performed by a non-public network measurement apparatus in an embodiment of the present disclosure, which may be implemented in software and/or hardware and is generally integrated into a base station. The method provided by the embodiment of the present disclosure specifically includes the following.

In 100, a RRC message including an NPN measurement configuration is sent to each of at least one selected UE through an air interface, to instruct each selected UE to perform corresponding NPN measurement.

The air interface may be an interface between the user equipment (UE) and a network device and includes a linking means of radio waves between the UE and the network device. The NPN measurement configuration may be information for controlling a UE to perform NPN measurement. The NPN measurement configuration may include parameters such as a measurement period and a measurement position. The radio resource control (RRC) message is the information used to allocate radio resources.

Specifically, the non-public network (NPN) measurement configuration may be sent to a selected UE through the RRC message, and the UE can perform NPN measurement according to the received NPN measurement configuration. It is understood that the selected UE may be a UE within an effective area.

In 110, a measurement report of the corresponding NPN measurement is received from each selected UE through an air interface. The measurement report includes a corresponding NPN measurement result of each selected UE.

The measurement report may be information including an NPN measurement result, and there are measurement reports corresponding to different UEs.

In the embodiment of the present disclosure, the base station can monitor a UE to obtain a measurement report from the UE. It is understood that the measurement report includes a measurement result of NPN measurement performed by the UE, and the NPN measurement can correspond to the NPN measurement configuration.

In the embodiment of the present disclosure, the RRC message including an NPN measurement configuration is sent through the air interface to a selected UE to control the UE to perform NPN measurement, and the NPN measurement report is then acquired from the UE. The NPN measurement report includes the measurement result of a corresponding UE. In this manner, the measurement of network information in the non-public network is realized, thereby facilitating network optimization and network capacity expansion.

Further, on the basis of the above-mentioned embodiment of the present disclosure, the NPN measurement configuration includes the following indication indicating one of: a measurement period, whether to record an identifier (ID) of a closed access group (CAG) connected to a UE in a connected state, whether to record a network identifier (NID) connected to a UE in a connected state, whether to record an ID of a CAG in which a UE in an idle state camps on, whether to record an NID in which a UE in an idle state camps on, whether to record an ID of a CAG connected to a UE in an inactive state, whether to record an NID connected to a UE in an inactive state, whether to record an NID failing to connect with a UE or in which a UE fails to camp on, an ID of a CAG failing to connect with a UE or in which a UE fails to camp on, whether to record an NID of manual selection, or whether to record an ID of a CAG of manual selection.

In the embodiment of the present disclosure, the measurement period may be a time period of NPN measurement performed by a UE and may be set by a user. It may also be determined in the process of NPN measurement whether to record an ID of a CAG connected to a UE in a connected state, whether to record an NID connected to a UE in a connected state, whether to record an ID of a CAG in which a UE in an idle state camps on, whether to record an NID in which a UE in an idle state camps on, whether to record an ID of a CAG in which a UE in an inactive state camps on, whether to record an NID in which a UE in an inactive state camps on, whether to record an NID failing to connect to a UE or in which a UE fails to camp on, whether to record an ID of a CAG failing to connect to a UE or in which a UE fails to camp on, whether to record an NID of manual selection, or whether to record an ID of a CAG of manual selection through recording a configuration such as an ID of a CAG connected to a UE in a connected state, an NID connected to a UE in a connected state, an ID of a CAG in which a UE in an idle state camps on, an NID in which a UE in an idle state camps on, an ID of a CAG connected to a UE in an inactive state, an NID connected to a UE in an inactive state, an NID failing to connect to a UE or in which a UE fails to camp on, an ID of a CAG failing to connect to a UE or in which a UE fails to camp on, an NID of manual selection, or an ID of a CAG of manual selection.

Further, on the basis of the above-mentioned embodiment of the present disclosure, the NPN measurement configuration is carried in MDT measurement configuration information.

In the embodiment of the present disclosure, the NPN measurement configuration, which is sent to at least one selected user equipment (UE) through an air interface, may be carried in MDT measurement configuration information, and thus NPN measurement is achieved through minimization of drive-tests (MDT) technology.

Further, on the basis of the above-mentioned embodiment of the present disclosure, the NPN measurement result includes at least one of the following: a recorded time point, recorded location point information, an ID of a CAG connected to a UE in a connected state, an NID connected to a UE in a connected state, an ID of a CAG in which a UE in an idle state camps on, an NID in which a UE in an idle state camps on, an ID of a CAG connected to a UE in an inactive state, an NID connected to a UE in an inactive state, a public land mobile network identifier (PLMN ID), a recorded NID failing to connect to a UE or in which a UE fails to camp on, a recorded ID of a CAG failing to connect to a UE or in which a UE fails to camp on, a recorded NID of manual selection, or a recorded CAG ID of manual selection.

FIG. 2 is a flowchart of another non-public network measurement method according to an embodiment of the present disclosure. The embodiment of the present disclosure is an embodiment based on the above-mentioned embodiment of the present disclosure. Referring to FIG. 2, the method provided by the embodiment of the present disclosure specifically includes the following.

In 200, at least one UE is selected to perform NPN measurement.

Specifically, selection may be performed among UEs connected to a base station, to facilitate NPN measurement of a UE.

In an exemplary embodiment, selecting at least one UE to perform NPN measurement includes: receiving a message from an upper-layer server, where the message includes an NPN area scope.

In the embodiment of the present disclosure, a message may be received from the upper-layer server, and a UE may be selected, through an NPN area scope in the message, to perform NPN measurement.

Further, the upper-layer server may include an operations, administration, and maintenance (OAM) function node and a data server.

Specifically, the base station may receive an NPN area scope from the OAM function node or the data server, and thus a UE is selected through the NPN area scope.

In another exemplary embodiment, selecting at least one UE to perform NPN measurement includes: obtaining an NPN area scope locally stored and configured by an OAM function node.

In the embodiment of the present disclosure, the base station may store the NPN area scope locally, and the NPN area scope may be configured by the OAM function node. Specifically, the NPN area scope may be acquired locally in the base station, and thus a UE is selected through the NPN area scope.

Further, on the basis of the above-mentioned embodiment of the present disclosure, the NPN area scope includes at least one of the following: a cell list or a tracking area list. A tracking area in the tracking area list includes at least one cell.

Specifically, the cell list may be an information list storing wireless communication service areas for a UE and may include wireless communication service areas corresponding to different UEs. The tracking area list may be an information list of an area in which the UE is located, and the tracking area in the tracking area list includes one or more cells.

In another exemplary embodiment, selecting at least one UE to perform NPN measurement includes: receiving a UE-associated message from a core network. The UE-associated message carries at least one of the following: a support indication of NPN MDT measurement or an NPN area scope.

The UE-related message may be message related to the UE and sent by the core network. Further, the UE-associated message includes at least one of an initial context setup request message, a handover request message, or a trace start message. An indication request for NPN minimization of drive-tests (MDT) measurement may be information which indicates whether a UE supports NPN MDT measurement. The NPN area scope may be information of an effective wireless communication area corresponding to each UE.

In the embodiment of the present disclosure, the UE-related message sent by the core network may be detected, and the UE-related message may include the support indication of NPN MDT measurement and the NPN area scope.

In 210, a RRC message including a NPN measurement configuration is sent to each of at least one selected UE through an air interface, to instruct each selected UE to perform a corresponding NPN measurement.

In 220, a measurement report of NPN measurement is received from the UE through an air interface. The measurement report includes a corresponding NPN measurement result of each selected UE.

FIG. 3 is a flowchart of another non-public network measurement method according to an embodiment of the present disclosure. The embodiment of the present disclosure is an embodiment based on the above-mentioned embodiment of the present disclosure. Referring to FIG. 3, the method provided by the embodiment of the present disclosure specifically includes the following.

In 300, at least one UE, which supports NPN MDT measurement, within an effective area is selected according to an NPN area scope.

Specifically, the effective area may be extracted from the NPN area scope, and a support indication of NPN MDT measurement of each UE is detected in the effective area, and when it is determined that a UE supports NPN MDT measurement, then the UE is selected.

In 310, a RRC message including an NPN measurement configuration is sent to each of at least one selected UE through an air interface, to instruct each selected UE to perform corresponding NPN measurement.

In 320, a measurement report of the NPN measurement is received from each selected UE through an air interface. The measurement report includes a corresponding NPN measurement result of each selected UE.

FIG. 4 is a flowchart of another non-public network measurement method according to an embodiment of the present disclosure. The embodiment of the present disclosure is an embodiment based on the above-mentioned embodiment of the present disclosure. Referring to FIG. 4, the method provided by the embodiment of the present disclosure specifically includes the following.

In 400, at least one UE is selected to perform NPN measurement according to a support indication of NPN MDT measurement in a UE-associated message sent by a core network.

Specifically, UE-related message may be received from the core network, and the indication for the support of NPN MDT measurement corresponding to each UE is extracted from the UE-related message. When it is determined, by judging the indication for the support of NPN MDT measurement, that a UE supports NPN MDT, the UE can be selected.

In 410, a RRC message including an NPN measurement configuration is sent to each of at least one selected UE through an air interface, to instruct each selected UE to perform corresponding NPN measurement.

In 420, a measurement report of the NPN measurement is received from each selected UE through an air interface. The measurement report includes a corresponding NPN measurement result of each selected UE.

FIG. 5 is a flowchart of another non-public network measurement method according to an embodiment of the present disclosure. The embodiment of the present disclosure is an embodiment based on the above-mentioned embodiment of the present disclosure. Referring to FIG. 5, the method provided by the embodiment of the present disclosure specifically includes the following.

In 500, at least one UE is selected to perform NPN measurement.

In 510, a RRC message including an NPN measurement configuration is sent to each of at least one selected UE through an air interface, to instruct each selected UE to perform corresponding NPN measurement.

In 520, a measurement report of NPN measurement is received from each selected UE through an air interface. The measurement report includes a corresponding NPN measurement result of each selected UE.

In 530, the received measurement report is transmitted to a target.

The target may be a position where the measurement report is received in the non-public network.

In the embodiment of the present disclosure, after the measurement report of each UE is received, the measurement report may be forwarded to other targets such as a base station, the core network, an OAM server, and data services in the non-public network.

In 540, the target is controlled to perform network optimization according to the measurement report.

Specifically, network information of the non-public network is determined through the measurement result in the measurement report, and thus network optimization can be performed on the target in the non-public network according to the network information.

Further, on the basis of the above-mentioned embodiment of the present disclosure, the target includes at least one of the following: a core network, an OAM server, a data service, or a base station.

In an exemplary embodiment, FIG. 6 is an example diagram of NPN MDT measurement according to an embodiment of the present disclosure. Referring to FIG. 6, a user equipment (UE) is configured by OAM to perform NPN MDT measurement as follows specifically.

In 1, a base station receives a message from an OAM network management node or a data server, for example, an MDT activation. The message includes at least an NPN area scope. The NPN area scope may be one or more of the following: a cell list or a tracking area (TA) list. One TA list may include one or more cells.

In 2, the base station selects, according to the NPN area scope, one or more UEs supporting NPN MDT measurement in an effective area.

In 3, the base station sends, through an air interface, an RRC message including an NPN measurement configuration to at least one selected UE, to instruct a relevant UE to perform relevant NPN measurement. The RRC message may be an RRC setup request message or an RRC reconfiguration message, and the NPN measurement configuration may be carried in MDT measurement configuration information which is in the message. The NPN measurement configuration is used to indicate how a UE performs NPN measurement. The NPN measurement configuration carries at least one of the following: a measurement period, whether to record an ID of a CAG connected to a UE in a connected state, whether to record an NID connected to a UE in a connected state, whether to record an ID of a CAG in which a UE in an idle state camps on, whether to record an NID in which a UE in an idle state camps on, whether to record an ID of a CAG connected to a UE in an inactive state, whether to record an NID connected to a UE in an inactive state, whether to record an NID failing to connect to a UE or in which a UE fails to camp on, whether to record an ID of a CAG failing to connect to a UE or in which a UE fails to camp on, whether to record an NID of manual selection, or whether to record an ID of a CAG of manual selection.

In 4, the UE performs relevant NPN measurement.

In 5, the base station receives a measurement report from the UE through an air interface. The measurement report includes an NPN measurement result of the UE. The NPN measurement result of the UE includes at least one of the following: a recorded time point, recorded location information, an ID of a CAG connected to a UE in a connected state, an NID connected to a UE in a connected state, an ID of a CAG in which a UE in an idle state camps on, an NID in which a UE in an idle state camps on, an ID of a CAG ID connected to a UE in an inactive state, an NID connected to a UE in an inactive state, a PLMN ID, a recorded NID failing to connect to a UE or in which a UE fails to camp on, a recorded ID of a CAG failing to connect to a UE or in which a UE fails to camp on, a recorded NID of manual selection, or a recorded ID of a CAG of manual selection.

In 6, the base station transmits the received measurement report of the UE to a core network or an OAM server, or a data server. Optionally, the base station receives the measurement report of the UE and may directly read NPN measurement information in the measurement report to perform network optimization, for example, to implement the load balancing between NPN cells.

In 7, the core network or the OAM server or the data server, or the base station performs network optimization according to the NPN measurement information.

Figure 7:
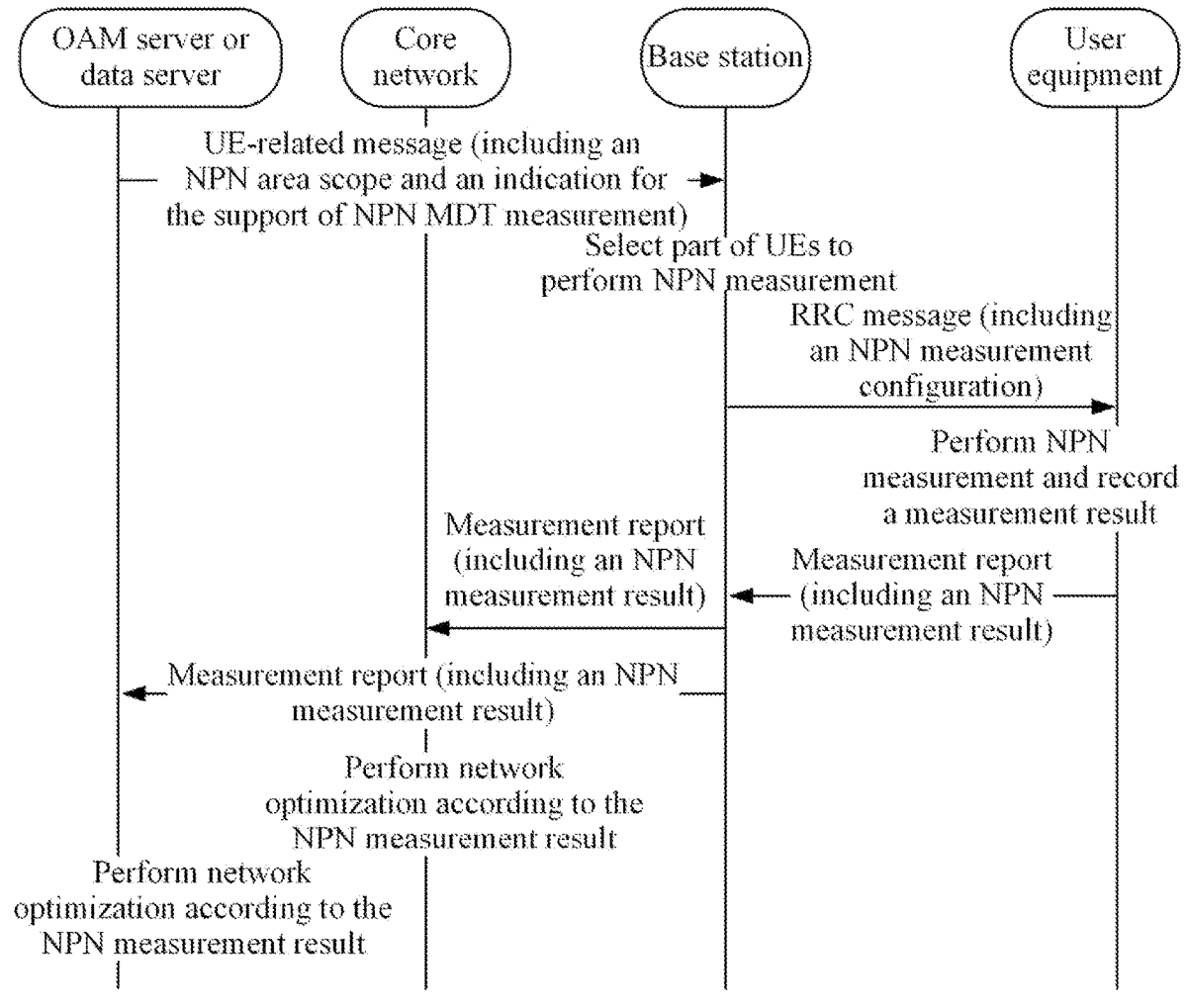
FIG. 7 is an exemplary diagram of another NPN MDT measurement according to an embodiment of the present disclosure.

In an exemplary embodiment, FIG. 7 is an exemplary diagram of another NPN MDT measurement according to an embodiment of the present disclosure. Referring to FIG. 7, user equipment is configured by signaling to perform NPN MDT measurement as follows specifically.

In 1, a base station receives a UE-related message from a core network, such as an initial context setup request message, a handover request message, or a trace start message. The message carries at least one of the following: an indication which indicates whether a UE supports NPN MDT measurement and is used for informing the base station whether the UE supports NPN measurement; an NPN area scope. The NPN area scope may be one or more of the following: a cell list or a tracking area (TA) list. One TA may include one or more cells.

In 2, the base station sends, through an air interface, an RRC message including an NPN measurement configuration to a UE, to instruct a relevant UE to perform relevant NPN measurement. The RRC message may be an RRC setup request message or an RRC reconfiguration message. The NPN measurement configuration may be carried in MDT measurement configuration information in the message. The NPN measurement configuration is used to indicate how the UE performs NPN measurement, and the NPN measurement configuration carries at least one of the following: a measurement period, whether to record an identifier (ID) of a closed access group (CAG) connected to a UE in a connected state, whether to record a network identifier (NID) connected to a UE in a connected state, whether to record an ID of a CAG in which a UE in an idle state camps on, whether to record an NID in which a UE in an idle state camps on, whether to record an ID of a CAG connected to a UE in an inactive state, whether to record an NID connected to a UE in an inactive state, whether to record an NID failing to connect to a UE or in which a UE fails to camp on, whether to record an ID of a CAG failing to connect to a UE or in which a UE fails to camp on, whether to record an NID of manual selection, or whether to record an ID of a CAG of manual selection.

In 4, the UE performs relevant NPN measurement.

In 5, the base station receives a measurement report from the UE through an air interface. The measurement report includes an NPN measurement result of the UE, which includes at least one of the following: a recorded time point, recorded location information, an ID of a CAG connected to a UE in a connected state, an NID connected to a UE in a connected state, an ID of a CAG in which a UE in an idle state camps on, an NID in which a UE in an idle state camps on, an ID of a CAG ID connected to a UE in an inactive state, an NID connected to a UE in an inactive state, a PLMN ID, a recorded NID failing to connect to a UE or in which a UE fails to camp on, a recorded ID of a CAG failing to connect to a UE or in which a UE fails to camp on, a recorded NID of manual selection, or a recorded ID of a CAG of manual selection.

In 6, the base station transmits the received measurement report of the UE to the core network or an OAM server, or a data server. Optionally, the base station may receive the measurement report of the UE and may directly read NPN measurement information in the measurement report to perform network optimization, for example, to implement the load balancing between NPN cells.

In 7, the core network or the OAM server or the data server, or the base station performs network optimization according to the NPN measurement information.

Figure 8:
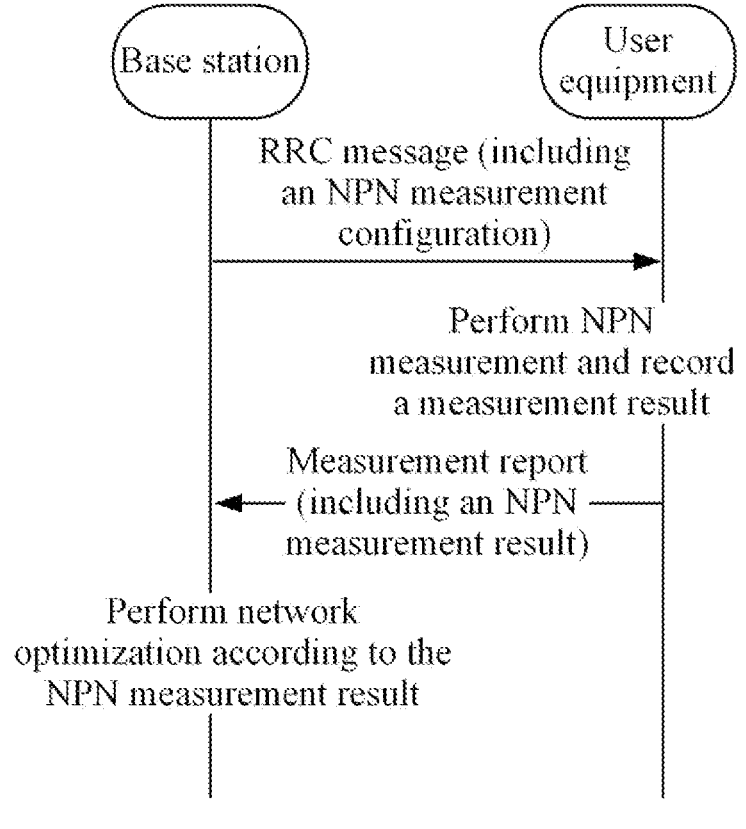
FIG. 8 is an exemplary diagram of the measurement when a UE is in a connected state according to an embodiment of the present disclosure.

In another exemplary embodiment, FIG. 8 is an exemplary diagram of the measurement when a UE is in a connected state according to an embodiment of the present disclosure. Referring to FIG. 8, the process of configuring, through an RRC message, the measurement when a UE is in a connected state is as follows.

In 1, a base station sends, through an air interface, an RRC message including an NPN measurement configuration to a UE, to instruct a relevant UE to perform relevant NPN measurement. The RRC message may be an RRC setup request message or an RRC reconfiguration message. The NPN measurement configuration may be carried in MDT measurement configuration information in the message. The NPN measurement configuration is used to indicate how a UE performs NPN measurement and carries at least one of the following: a measurement period, whether to record an ID of a CAG connected to a UE in a connected state, or whether to record an NID connected to a UE in a connected state.

In 2, the UE in a connected state performs relevant NPN measurement.

In 3, the base station receives a measurement report from the UE through an air interface. The measurement report includes an NPN measurement result of the UE, which includes at least one of the following: a recorded time point, recorded location information, an ID of a CAG connected to a UD in a connected state, an NID connected to a UE in a connected state, or a PLMN ID.

In 4, the base station performs network optimization according to NPN measurement information, for example, to implement the load balancing between NPN cells.

Figure 9:
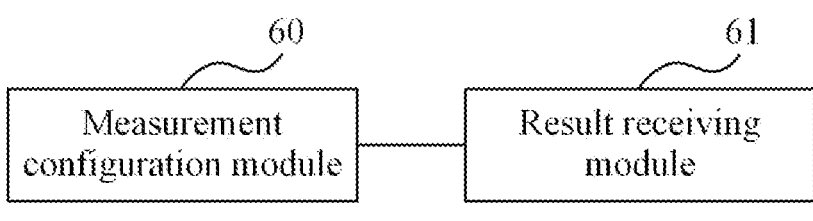
FIG. 9 is a structural diagram of a non-public network measurement apparatus according to an embodiment of the present disclosure.

FIG. 9 is a structural diagram of a non-public network measurement apparatus according to an embodiment of the present disclosure. The apparatus of the embodiment of the present disclosure can execute the non-public network measurement method provided by any embodiment of the present disclosure and has corresponding functional modules and beneficial effects for executing the method. The apparatus may be implemented in software and/or hardware and is typically integrated into a remote server. The apparatus specifically includes a measurement configuration module 60 and a result receiving module 61.

The measurement configuration module 60 is configured to send, through an air interface, a radio resource control (RRC) message including a non-public network (NPN) measurement configuration to at least one selected user equipment (UE), to instruct the UE to perform corresponding NPN measurement.

The result receiving module 61 is configured to receive a measurement report of the NPN measurement from the UE through an air interface, where the measurement report includes an NPN measurement result of a corresponding UE.

In the embodiment of the present disclosure, by using the measurement configuration module, the RRC message including the NPN measurement configuration is sent, through the air interface, to the selected UE, to control the UE to perform NPN measurement, and by using the result receiving module, the NPN measurement report fed back by the UE is acquired. The NPN measurement report includes the measurement result of a corresponding UE. In this manner, the measurement of network information in the non-public network is realized, thereby facilitating network optimization and network capacity expansion.

Further, on the basis of the above-mentioned embodiment of the present disclosure, the NPN measurement configuration in the measurement configuration module 60 includes the following indication indicating one of: a measurement period, whether to record an identifier (ID) of a closed access group (CAG) connected to a UE in a connected state, whether to record a network identifier (NID) connected to a UE in a connected state, whether to record an ID of a CAG in which a UE in an idle state camps on, whether to record an NID in which a UE in an idle state camps on, whether to record an ID of a CAG connected to a UE in an inactive state, whether to record an NID connected to a UE in an inactive state, whether to record an NID failing to connect to a UE or in which a UE fails to camp on, whether to record an ID of a CAG failing to connect to a UE or in which a UE fails to camp on, whether to record an NID of manual selection, or whether to record an ID of a CAG of manual selection.

Further, on the basis of the above-mentioned embodiment of the present disclosure, the apparatus further includes: an equipment selection module configured to select at least one user equipment (UE) to perform NPN measurement.

Further, on the basis of the above-mentioned embodiment of the present disclosure, the equipment selection module includes: a message receiving unit configured to receive a message from an upper-layer server, where the message includes an NPN area scope.

Further, on the basis of the above-mentioned embodiment of the present disclosure, the equipment selection module includes: a local information unit configured to obtain an NPN area scope locally stored and configured by OAM.

Further, on the basis of the above-mentioned embodiment of the present disclosure, the NPN area scope in the equipment selection module includes at least one of the following: a cell list or a tracking area list. A tracking area in the tracking area list includes at least one cell.

Further, on the basis of the above-mentioned embodiment of the present disclosure, the upper-layer server in the message receiving unit includes at least one of an OAM function node or a data server.

Further, on the basis of the above-mentioned embodiment of the present disclosure, the equipment selection module includes a core selection unit which is configured to receive a UE-associated message from a core network. The UE-associated message carries at least one of the following: a support indication of NPN MDT measurement or an NPN area scope.

Further, on the basis of the above-mentioned embodiment of the present disclosure, the UE-associated message includes at least one of an initial context setup request message, a handover request message, or a trace start message.

Further, on the basis of the above-mentioned embodiment of the present disclosure, the equipment selection module includes a first selection unit configured to select at least one UE, which supports NPN MDT measurement, within an effective area according to an NPN area scope.

Further, on the basis of the above-mentioned embodiment of the present disclosure, the equipment selection module includes a first selection unit configured to select, according to the support indication of NPN MDT measurement in the UE-associated message sent by the core network, at least one UE to perform NPN measurement.

Further, on the basis of the above-mentioned embodiment of the present disclosure, the RRC message in the measurement configuration module 60 includes at least one of the following: an RRC setup request message or an RRC reconfiguration message.

Further, on the basis of the above-mentioned embodiment of the present disclosure, the NPN measurement configuration in the measurement configuration module 60 is carried in MDT measurement configuration information.

Further, on the basis of the above-mentioned embodiment of the present disclosure, the NPN measurement result in the result receiving module 61 includes at least one of the following: a recorded time point, recorded location point information, an identifier (ID) of a closed access group (CAG) connected to a UE in a connected state, an NID connected to a UE in a connected state, an ID of a CAG in which a UE in an idle state camps on, an NID in which a UE in an idle state camps on, an ID of a CAG connected to a UE in an inactive state, an NID connected to a UE in an inactive state, a public land mobile network identifier (PLMN ID), a recorded NID failing to connect to a UE or in which a UE fails to camp on, a recorded ID of a CAG failing to connect to a UE or in which a UE fails to camp on, a recorded NID of manual selection, or a recorded CAG ID of manual selection.

Further, on the basis of the above-mentioned embodiment of the present disclosure, the apparatus further includes: a result transmitting module configured to transmit the received measurement report to a target.

Further, on the basis of the above-mentioned embodiment of the present disclosure, the apparatus further includes: a network optimization module configured to control a target to perform network optimization according to the measurement report.

Further, on the basis of the above-mentioned embodiment of the present disclosure, the target in the result transmitting module and/or the network optimization module includes at least one of the following: a core network, an OAM server, a data server, or a base station.

Figure 10:
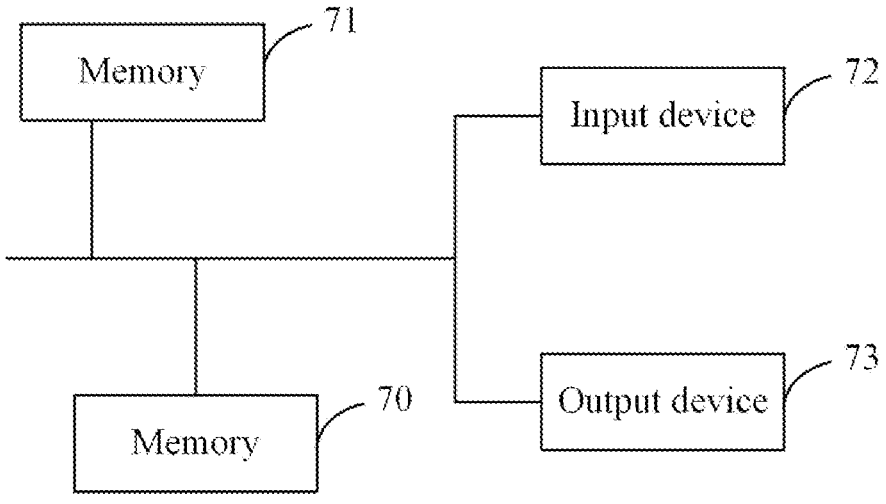
FIG. 10 is a diagram illustrating the structure of a device according to an embodiment of the present disclosure.

FIG. 10 is a diagram illustrating the structure of a device according to an embodiment of the present disclosure. As shown in FIG. 10, the device includes a processor 70, a memory 71, an input device 72, and an output device 73. The number of the processor 70 in the device may be one or more, for example, one processor 70 is taken as an example in FIG. 10. The processor 70, the memory 71, the input device 72, and the output device 73 in the device may be connected through a bus or in other ways. In FIG. 10, the connection through a bus is taken as an example.

As a computer-readable storage medium, the memory 71 may be configured to store software programs, computer-executable programs, and modules, such as modules (the measurement configuration module 60 and the result receiving module 61) corresponding to a non-public network measurement apparatus according to an embodiment of the present disclosure. The processor 70 runs software programs, instructions, and modules stored in the memory 71 to perform function applications and data processing of the device, that is, to implement the method described above.

The memory 71 may mainly include a program storage area and a data storage area. The program storage area may store an operating system and an application program required for implementing at least one function, and the data storage area may store data created depending on the use of the device. In addition, the memory 71 may include a high-speed random-access memory and may also include a non-volatile memory, such as at least one disk memory, a flash memory or other non-volatile solid-state memories. In some examples, the memory 71 may further include memories located remotely relative to the processor 70 and these remote memories may be connected to the device via a network. Examples of the above network include, but are not limited to, the Internet, an intranet, a local area network, a mobile communication network, and a combination thereof.

The input device 72 may be used for receiving inputted digital or character information and for generating key signal input related to user settings of the device and function control of the device. The output device 73 may include a display screen and other display devices.

An embodiment of the present disclosure further provides a computer-readable storage medium, and when executed by a computer processor, computer-executable instructions are used for performing a non-public network measurement method. The method includes:

sending, through an air interface, a radio resource control (RRC) message including a non-public network (NPN) measurement configuration to at least one selected user equipment (UE), to instruct the UE to perform corresponding NPN measurement; and receiving a measurement report of the NPN measurement from the UE through an air interface. The measurement report includes an NPN measurement result of a corresponding UE.

Of course, an embodiment of the present disclosure provides a storage medium containing computer-executable instructions, which are not limited to the method operations described above but may also perform related operations in the non-public network measurement method provided by any embodiment of the present disclosure.

The preceding are only exemplary embodiments of the present disclosure and are not intended to limit the scope of the present disclosure.

It is to be understood by those skilled in the art that the term "user equipment" covers any suitable type of wireless user equipment, for example, a mobile phone, a portable data processing apparatus, a portable web browser, or a vehicle-mounted mobile station.

In general, multiple embodiments of the present disclosure may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present disclosure is not limited thereto.

The embodiments of the present disclosure may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcode, firmware instructions, state setting data, or source codes or object codes written in any combination of one or more programming languages.

A block diagram of any logic flow among the drawings of the present disclosure may represent program steps, may represent interconnected logic circuits, modules, and functions, or may represent a combination of program steps with logic circuits, modules, and functions. The computer programs may be stored in a memory. The memory may be of any type appropriate for a local technical environment and may be implemented by using any appropriate data storage technology, such as, but not limited to, a read-only memory (ROM), a random access memory (RAM), an optical memory device, and a system (a digital versatile disc (DVD) or a compact disk (CD)). A computer-readable medium may include a non-transitory storage medium. A data processor may be of any type appropriate for the local technical environment, such as, but not limited to, a general-purpose computer, a special-purpose computer, a microprocessor, a digital signal processor (DSP), an application-specific integrated circuit (ASIC), a field programmable gate array (FPGA), and a processor based on a multi-core processor architecture.

A detailed description of exemplary embodiments of the present disclosure has been provided above through exemplary and non-restrictive examples. However, considering the drawings and claims, various modifications and adjustments to the preceding embodiments are apparent to those skilled in the art but do not deviate from the scope of the present disclosure. Accordingly, the proper scope of the present disclosure is determined according to the claims.

What is claimed is:

1. A non-public network measurement method, applied to a base station, comprising:

sending, through an air interface, a radio resource control (RRC) message comprising a non-public network (NPN) measurement configuration to a selected user equipment (UE), to instruct the selected UE to perform a NPN measurement; and receiving a measurement report of the NPN measurement from the selected UE through an air interface, wherein the measurement report comprises a NPN measurement result of the selected UE;

wherein the NPN measurement configuration comprises at least one of:

a measurement period, whether to record an identifier (ID) of a closed access group (CAG) connected to a UE in a connected state, whether to record a network identifier (NID) connected to a UE in a connected state, whether to record an ID of a CAG in which a UE in an idle state camps on, whether to record an NID in which a UE in an idle state camps on, whether to record an ID of a CAG connected to a UE in an inactive state, whether to record an NID connected to a UE in an inactive state, whether to record an NID failing to connect to a UE or in which a UE fails to camps on, whether to record an ID of a CAG failing to connect to a UE or in which a UE fails to camps on, whether to record an NID of manual selection, or whether to record an ID of a CAG of manual selection.

2. The method of claim 1, further comprising:

selecting a UE as the selected UE to perform the NPN measurement.

3. The method of claim 2, wherein the selecting a UE as the selected UE to perform the NPN measurement comprises:

receiving a message from an upper-layer server, wherein the message comprises an NPN area scope.

4. The method of claim 3, wherein the NPN area scope comprises at least one of the following:

a cell list; or a tracking area list, wherein a tracking area in the tracking area list comprises at least one cell.

5. The method of claim 3, wherein the upper-layer server comprises at least one of:

an OAM function node or a data server.

6. The method of claim 2, wherein the selecting a UE as the selected UE to perform the NPN measurement comprises:

obtaining an NPN area scope locally stored and configured by an operations, administration, and maintenance (OAM) function node.

7. The method of claim 6, wherein the NPN area scope comprises at least one of the following:

a cell list; or
a tracking area list, wherein a tracking area in the tracking area list comprises at least one cell.

8. The method of claim 2, wherein the selecting a UE as the selected UE to perform the NPN measurement comprises:

receiving a UE-associated message from a core network, wherein the UE-associated message carries at least one of the following: a support indication of NPN minimization of drive-tests (MDT) measurement, or an NPN area scope.

9. The method of claim 8, wherein the UE-associated message comprises at least one of an initial context setup request message, a handover request message, or a trace start message.

10. The method of claim 8, wherein the selecting a UE as the selected UE to perform the NPN measurement comprises:

selecting, within an effective area and according to the NPN area scope, a UE supporting the NPN MDT measurement as the selected UE.

11. The method of claim 8, wherein the selecting a UE as the selected UE to perform the NPN measurement comprises:

selecting, according to the support indication of NPN MDT measurement, a UE as the selected UE to perform the NPN measurement.

12. The method of claim 1, wherein the RRC message comprises at least one of the following: an RRC setup request message or an RRC reconfiguration message.

13. The method of claim 1, wherein the NPN measurement configuration is carried in MDT measurement configuration information.

14. The method of claim 1, wherein the NPN measurement result comprises at least one of the following:

a recorded time point, recorded location point information, an ID of a CAG connected to a UE in a connected state, an NID connected to a UE in a connected state, an ID of a CAG in which a UE in an idle state camps on, an NID in which a UE in an idle state camps on, an ID of a CAG connected to a UE in an inactive state, an NID connected to a UE in an inactive state, a public land mobile network identifier (PLMN ID), a recorded NID failing to connect to a UE or in which a UE fails to camps on, a recorded ID of a CAG failing to connect to a UE or in which a UE fails to camps on, a recorded NID of manual selection, or a recorded CAG ID of manual selection.

15. The method of claim 1, further comprising:

transmitting the received measurement report to a target, wherein the target is a position where the measurement report is received in an NPN.

16. The method of claim 15, wherein the target comprises at least one of the following: a core network, an OAM server, a data server, or a base station.

17. The method of claim 1, further comprising:

controlling a target to perform network optimization according to the received measurement report, wherein the target is a position where the measurement report is received in an NPN.

18. A base station, comprising:

one or more processors; and
a memory, which is configured to store one or more programs;
wherein when the one or more programs are executed by the one or more processors, the one or more processors implement:

sending, through an air interface, a radio resource control (RRC) message comprising a non-public network (NPN) measurement configuration to a selected user equipment (UE), to instruct the selected UE to perform a NPN measurement; and receiving a measurement report of the NPN measurement from the selected UE through an air interface, wherein the measurement report comprises a NPN measurement result of the selected UE;

wherein the NPN measurement configuration comprises at least one of:

a measurement period,
whether to record an identifier (ID) of a closed access group (CAG) connected to a UE in a connected state,
whether to record a network identifier (NID) connected to a UE in a connected state,
whether to record an ID of a CAG in which a UE in an idle state camps on,
whether to record an NID in which a UE in an idle state camps on,
whether to record an ID of a CAG connected to a UE in an inactive state,
whether to record an NID connected to a UE in an inactive state,
whether to record an NID failing to connect to a UE or in which a UE fails to camps on,
whether to record an ID of a CAG failing to connect to a UE or in which a UE fails to camps on,
whether to record an NID of manual selection, or
whether to record an ID of a CAG of manual selection.

19. A non-transitory computer-readable storage medium storing computer programs, wherein when executed by a processor, the computer programs implement:

sending, through an air interface, a radio resource control (RRC) message comprising a non-public network (NPN) measurement configuration to a selected user equipment (UE), to instruct the selected UE to perform a NPN measurement; and receiving a measurement report of the NPN measurement from the selected UE through an air interface, wherein the measurement report comprises a NPN measurement result of the selected UE;

wherein the NPN measurement configuration comprises at least one of:

a measurement period,
whether to record an identifier (ID) of a closed access group (CAG) connected to a UE in a connected state,
whether to record a network identifier (NID) connected to a UE in a connected state, whether to record an ID of a CAG in which a UE in an idle
state camps on,
whether to record an NID in which a UE in an idle state
camps on,
whether to record an ID of a CAG connected to a UE in
an inactive state,
whether to record an NID connected to a UE in an inactive
state,
whether to record an NID failing to connect to a UE or in
which a UE fails to camps on,
whether to record an ID of a CAG failing to connect to a
UE or in which a UE fails to camps on,
whether to record an NID of manual selection, or
whether to record an ID of a CAG of manual selection.

* * * * *